United States Patent
Seo et al.

(10) Patent No.: US 8,737,287 B2
(45) Date of Patent: May 27, 2014

(54) SCHEDULING METHOD AND APPARATUS IN A RELAY COMMUNICATION SYSTEM

(75) Inventors: Han-Byul Seo, Gyeonggi-do (KR);
Daeyoung Park, Incheon (KR);
Byoung-Hoon Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 55 days.

(21) Appl. No.: 13/389,437

(22) PCT Filed: Jul. 30, 2010

(86) PCT No.: PCT/KR2010/005050
§ 371 (c)(1),
(2), (4) Date: Feb. 7, 2012

(87) PCT Pub. No.: WO2011/019152
PCT Pub. Date: Feb. 17, 2011

(65) Prior Publication Data
US 2012/0140699 A1    Jun. 7, 2012

Related U.S. Application Data

(60) Provisional application No. 61/232,462, filed on Aug. 9, 2009.

(30) Foreign Application Priority Data

Dec. 10, 2009  (KR) .......................... 10-2009-0122774

(51) Int. Cl.
*H04B 7/14* (2006.01)
(52) U.S. Cl.
USPC .......................................................... 370/315
(58) Field of Classification Search
USPC ................ 370/208, 229, 252, 315, 351, 412; 455/13.1, 450; 375/132
See application file for complete search history.

(56) References Cited

U.S. PATENT DOCUMENTS

| | | | |
|---|---|---|---|
| 2007/0264932 A1* | 11/2007 | Suh et al. | 455/13.1 |
| 2008/0056334 A1* | 3/2008 | Suh et al. | 375/132 |
| 2008/0165719 A1* | 7/2008 | Visotsky | 370/315 |
| 2008/0188231 A1* | 8/2008 | Zhu et al. | 455/450 |
| 2008/0279207 A1* | 11/2008 | Jones | 370/412 |
| 2009/0310478 A1* | 12/2009 | Salem et al. | 370/208 |
| 2009/0310498 A1* | 12/2009 | Nogami | 370/252 |

FOREIGN PATENT DOCUMENTS

| | | |
|---|---|---|
| KR | 1020060021218 | 3/2006 |
| KR | 1020070109582 | 11/2007 |
| KR | 1020090052751 | 5/2009 |

* cited by examiner

*Primary Examiner* — Anh-Vu Ly
*Assistant Examiner* — Gustavo Lopez-Vargas
(74) *Attorney, Agent, or Firm* — Lee, Hong, Degerman, Kang & Waimey

(57) ABSTRACT

Disclosed are a packet scheduling method and apparatus in a relay network. A scheduling method of a relay station in a relay communication system includes: receiving information regarding an amount of generated data to be transmitted to a user from a base station; estimating the size of a queue of the base station storing the data to be transmitted to the user based on the amount of generated data received from the base station; obtaining the size of a virtual queue in which overall data to be transmitted to a user with reference to the estimated size of the queue of the base station and the size of a queue of the relay station storing data to be transmitted to a user; performing scheduling to allocate resource based on the size of the virtual queue; and transmitting data to the user based on the scheduling results.

8 Claims, 8 Drawing Sheets

SCHEDULING METHOD AND APPARATUS IN A RELAY COMMUNICATION SYSTEM

CROSS-REFERENCE TO RELATED APPLICATIONS

This application is the National Stage filing under 35 U.S.C. 371 of International Application No. PCT/KR2010/005050, filed on Jul. 30, 2010, which claims the benefit of earlier filing date and right of priority to Korean Application No. 10-2009-0122774, filed on Dec. 10, 2009, and also claims the benefit of U.S. Provisional Application Ser. No. 61/232,462, filed on Aug. 9, 2009, the contents of which are all incorporated by reference herein in their entirety.

TECHNICAL FIELD

The present invention relates to a scheduling method and apparatus in a relay system and,
more particularly, to a scheduling method and apparatus of a relay for ensuring optimum throughput and fairness among users.

BACKGROUND ART

A general cellular network configures a radio communication link having high mutual reliability through a centralized cell design in which communication is performed through a direct link between a base station and a terminal in a cell covered by the base station.

However, recently, communication networks tend to use a high service frequency band, and the radius of cells tends to be reduced in order to support high speed communication and accommodate a larger amount of calls, so the use of the existing centralized cellular radio network scheme as it is in the future involves many problems. Namely, since the location of a base station is fixed, flexibility of a radio link configuration deteriorates, having a difficulty in providing an effective communication service in a radio environment in which a traffic distribution or a call request amount are excessively changed.

Thus, a next-generation communication system should be distributedly controlled and established and actively cope with a change in an environment such as an additional installation of a new base station, and as a solution to the foregoing problems, a relay system has been proposed. A relay system is advantageous in that it extends cell service coverage by covering a partial shadow area generated in a cell region and increases a system capacity. In addition, a relay (referred to as a 'relay station', hereinafter) may be used at an initial situation when service requests are relatively low to reduce the burden of an initial installation cost.

In a system using a relay station, a user to which resource is directly allocated through a base station and a user to which resource is allocated by way of the relay station coexist. In this case, the base station is supposed to perform scheduling in consideration of all of the amount of packets served by the base station, the amount of packets served by the relay station, the size of a queue of the base station, and the size of a queue of the relay station, to thus optimize a packet transfer rate and equally allocate resources to all the users. However, currently, a scheduling method in consideration of the foregoing matters has yet to be proposed for such a relay system.

DISCLOSURE

Technical Problem

Therefore, an object of the present invention is to provide a scheduling method and apparatus of a relay for ensuring optimum throughput and fairness among users in a relay communication system.

Technical Solution

According to an aspect of the present invention, there is provided a scheduling method of a relay station in a relay communication system,
including: receiving information regarding an amount of generated data to be transmitted to a user from a base station; estimating the size of a queue of the base station storing the data to be transmitted to the user based on the amount of generated data received from the base station; obtaining the size of a virtual queue in which overall data to be transmitted to a user with reference to the estimated size of the queue of the base station and the size of a queue of the relay station storing data to be transmitted to a user; performing scheduling to allocate resource based on the size of the virtual queue; and transmitting data to the user based on the scheduling results.

According to another aspect of the present invention, there is provided a scheduling method of a relay station in a relay communication system, including: periodically receiving information regarding the amount of generated data to be transmitted to a user from a base station to estimate the size of a queue of the base station storing data to be transmitted to a user; periodically receiving the information regarding the size of the queue of the base station storing the data to be transmitted to the user from the base station to update the estimated size of the queue of the base station; obtaining the size of a virtual queue storing overall data to be transmitted to a user with reference to the updated size of the queue of the base station and the size of a queue of the relay station storing data to be transmitted to a user; performing scheduling to allocate resource based on the size of the virtual queue; and transmitting data to the user based on the scheduling results.

According to another aspect of the present invention, there is provided a scheduling method of a relay station in a relay communication system, including: receiving information regarding the size of a queue of a base station storing data to be transmitted to a user from the base station when the size of the queue of the base station corresponds with a predetermined reference; obtaining the size of a virtual queue storing overall data to be transmitted to a user with reference to the information regarding the size of the queue received from the base station and the size of a queue of the relay station storing data to be transmitted to a user; performing scheduling to allocate resource based on the size of the virtual queue; and transmitting data to the user based on the scheduling results.

According to another aspect of the present invention, there is provided a scheduling method of a relay station in a relay communication system, including: receiving user index information indicating that the amount of data to be transmitted to a user exceeds a certain reference, from a base station; determining a priority level of resource allocation of each user with reference to a user index information received from the base station and the size of a queue of the relay station storing data to be transmitted to a user; and transmitting data to the user based on the scheduling results.

According to another aspect of the present invention, there is provided a scheduling apparatus of a relay station in a relay communication system, including: a receiver configured to receive the amount of generated data to be transmitted to a user and information regarding the size of queue of a base station storing data to be transmitted to the user from the base station; a virtual queue estimator configured to estimate the size of the queue of the base station storing the data to be transmitted to the user based on the amount of generated data received from the base station and determine the size of a virtual queue storing overall data to be transmitted to a user with reference to the estimated size of the queue of the base station and the size of a queue of the relay station storing data to be transmitted to a user; a scheduler configured to perform scheduling to allocate resource based on the size of the virtual queue determined by the virtual queue estimator; and a transmitter configured to transmit data to the user based on the scheduling results of the scheduler.

Advantageous Effects

According to embodiments of the present invention, fairness between a user who is provided with a packet service from a base station through a direct link with the base station an a user provided with a packet service from a relay station through a relay link is guaranteed, and for the user who receives a packet through the relay link, delay in a packet reception as in the related art can be reduced, enhancing delay performance.

BEST MODES

The exemplary embodiments of the present invention will now be described with reference to the accompanying drawings, in which like numbers refer to like elements throughout. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings.

Hereafter, a term of a user (or a terminal) is used, and the user may be called by other names such as UT (User Terminal), SS (Subscriber Station), UE (User Equipment), ME (Mobile Equipment), or MS (Mobile Station). Also, the terminal may be a portable device having a communication function such as a mobile phone, a PDA, a smart phone, a notebook computer, or the like, or a device which is not portable, such as a PC, a vehicle-mount device.

Figure 1:
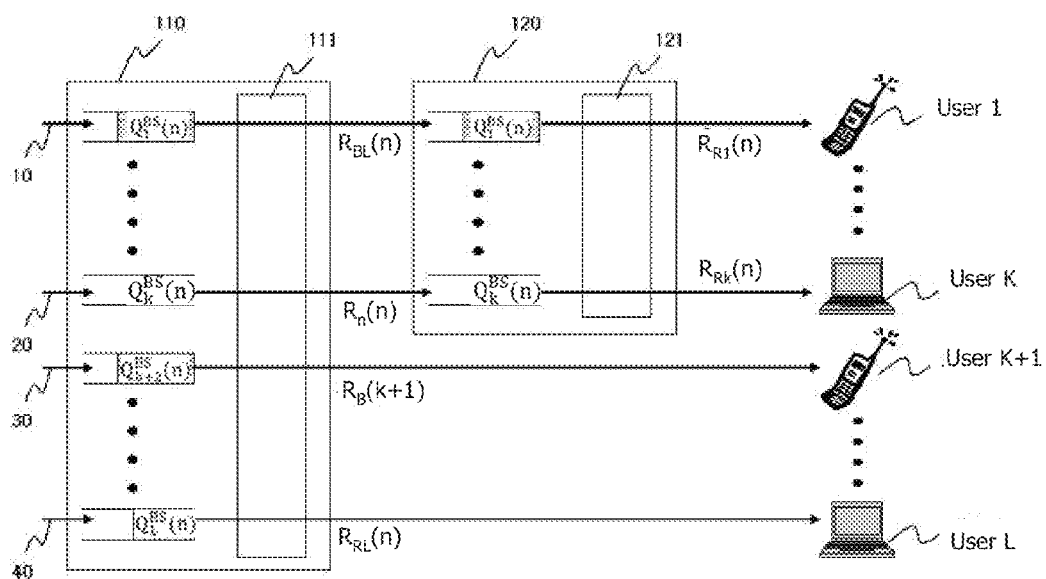
FIG. 1 is a view conceptually showing packet scheduling of a base station and a relay station in a wireless relay network environment.

FIG. 1 is a view conceptually showing packet scheduling of a base station (BS) and a relay station (RS) in a wireless relay network environment.

As shown in FIG. 1, in a relay communication system in which a relay station 120 plays a relay role between a base station 110 and a plurality of users (user 1, . . . , user K, user K+1, . . . , user L), packets 10, 20, 30, 40 of each user arrive at the base station 110 through a backbone network, the corresponding packets are stored in a queue $Q^{BS}$ for each user in the base station 110.

With reference to FIG. 1, it is assumed that communication is performed according a time-division scheme in which packets of only one user are transmitted between the base station 110 and the relay station 120, for the sake of explanation, and also, it is assumed that the base station 110 transmits packets to the first user (user 1) to the Kth user (user K) through the relay station 120 and the base station 110 directly transmits packets to the (K+1)th user (user K+1) to Lth user (user L). However, the present invention is not limited to the environment as illustrated in FIG. 1 and a case in which packets of several users may be simultaneously transmitted between the base station 110 and the relay station 120 may also be included.

When a transfer rate of a channel link between the base station 110 and the relay station 120 in which a packet of the Kth user is transmitted is $R_{Bk}(n)$ and a transfer rate of a channel link between the relay station 120 and the user K in which the packet of the Kth user is transmitted is $R_{Rk}(n)$, since the channel link between the base station 110 and the relay station 120 is common to the first user (user 1) to the Kth user (user K), so it may be expressed such that $R_{Bk}(n)=R_{BR}(n)$, (k=1, 2, 3, . . . , K).

Also, when the amount of packets of the Kth user transferred from the base station 110 is $A_k^{BS}(n)$, the amount of packets of the Kth user transferred from the base station 110 to the relay station 120 is $A_k^{RS}(n)$, and the amount of packets of the Kth user accumulated in a queue within the relay station 120 is $Q_k^{BS}(n)$, a queue of the base station 110 in which packets to be transmitted to the Kth user at (n+1)th time are accumulated can be expressed by Equation 1 shown below:

$$Q_k^{BS}(n+1)=\max(Q_k^{BS}(n)-S_k^{BS}(n),0)+A_k^{BS}(n) \quad [\text{Equation 1}]$$

In Equation 1, $S_k^{BS}(n)$ is the amount of packets served by the base station 110.

Also, the queue of the relay station 120 in which packets to be transmitted to the Kth user at the (n+1)th time can be expressed by Equation 2 shown below:

$$Q_k^{RS}(n+1)=\max(Q_k^{RS}(n)-S_k^{RS}(n),0)+A_k^{RS}(n) \quad [\text{Equation 2}]$$

In Equation 2, $S_k^{RS}(n)$ is the amount of packets served by the relay station 120.

Here, when it is assumed that the base station 110 performs scheduling in a max backlog manner, the base station 110 performs scheduling as expressed by Equation 3 and Equation 4 shown below:

$$k^{BS}(n) = \arg\max_{k=1,\ldots,L} \gamma_k R_{BK}(n)Q_k^{BS}(n) \quad [\text{Equation 3}]$$

$$S_k^{BS}(n) = A_k^{RS}(n) = \min(R_{BR}(n)1_{k=k^{BS}(n)}, Q_k^{BS}(n)) \quad [\text{Equation 4}]$$

In Equation 3 and Equation 4, $\gamma_k$ is a constant and $1_{k=k^{BS}(n)}$ is an indicator function having a value 1 when $K=k^{BS}(n)$ and a value 0 when $k \neq k^{BS}(n)$.

In Equation 4, the amount of packets $S_k^{BS}(n)$ served by the base station 110 is equal to the amount of packets $A_k^{RS}(n)$ arriving at the relay station 120, and has a smaller value among a link transfer rate of the selected user and the size of the queue.

Thus, packets from the base station 110 are not transmitted to a user who has not been selected, and when the size of the queue is smaller than the link transfer rate, only packets accumulated in the queue of the base station 110 are transmitted.

Similarly, when it is assumed that the relay station 120 performs scheduling in a max backlog manner, the relay station 120 performs scheduling as expressed by Equation 5 and Equation 6 shown below:

$$k^{RS}(n) = \arg\max_{k=1,\ldots,K} \gamma_k R_{RK}(n) Q_k^{RS}(n) \quad \text{[Equation 5]}$$

$$S_k^{RS}(n) = \min(R_{Rk}(n) 1_{k=k^{RS}(n)}, Q_k^{RS}(n)) \quad \text{[Equation 6]}$$

The scheduling performed by the base station 110 and the relay station 120 as expressed by Equation 3 to Equation 6 is a scheme of preferentially selecting a user who has the largest product of the transfer rate of the current link and the size of the queue and allocating resource thereto. Thus, in a sense that the user having the largest backlog is given preference, the scheme is called a max backlog scheduling scheme.

Meanwhile, when it is assumed that the base station 110 performs scheduling based on a max differential backlog scheme, the base station 110 performs scheduling as expressed by Equation 7 and Equation 8 shown below:

$$k^{BS}(n) = \arg\max_k \gamma_k R_{Bk}(n) Q_k(n) \quad \text{[Equation 7]}$$

$$Q_k(n) = \begin{cases} Q_k^{BS}(n) - Q_k^{RS}(n), & k = 1, 2, \ldots, K \\ Q_k^{BS}(n), & k = K+1, \ldots, L \end{cases}$$

$$S_k^{BS}(n) = A_k^{RS}(n) = \min(R_{BR}(n) 1_{k=k^{BS}(n)}, Q_k^{BS}(n)) \quad \text{[Equation 8]}$$

Also, when it is assumed that the relay station 120 performs scheduling based on the max differential backlog scheme, the relay station 120 performs scheduling in the same manner as that of Equation 5 and Equation 6 as discussed above. Like the state of the queue of Equation 7, the max differential backlog type scheduling scheme is a scheme of allocating resource, starting from a user given priority because his value obtained by subtracting the size of the queue of the relay station 120 from the size of the queue in which the packets accumulated in the base station are stored is the largest, among the respective users. Thus, when the system can be made to become stable in consideration of the amount of packets arriving from a backbone network and a state of a radio channel, the system can become stable by using the max different backlog type scheduling, and it may correspond to a scheduling scheme for ensuring an optimum transfer rate (throughput optimal).

However, referring to the scheduling scheme described through Equation 3 to Equation 8, a scheduling metric of the users (user 1, . . . , user K) to which packets are transferred through the relay station 120 from the base station 110 and that of the users (user K+1, . . . , user L) to which packets are transmitted through a direct link from the base station 110 are different, so, in comparison to the users to which packets are transmitted through the direct link, the users to which packets are transmitted through the relay station 120 are at a disadvantage, in terms of resource allocation.

Hereinafter, a scheduling method of the relay station 120 capable of increasing fairness between a user to which a packet is transmitted through a direct link and a user to which a packet is transmitted through the relay station 120 and enhancing packet reception delay performance of a user to which a packet is transmitted through the relay station 120 will be described.

First, the base station 110 performs scheduling in such manners as expressed by Equation 3 and Equation 4 above.

The relay station 120, employing the scheme of preferentially allocating resource to a user whose sum of the queue of the base station and the queue of the relay station is large, performs scheduling in such manners as expressed by Equation 9 and Equation 10.

$$\gamma^{RS}(n) = \arg\max_{k=1,\ldots,K} \gamma_k R_{Rk}(n)(Q_k^{BS}(n) + Q_k^{RS}(n)) \quad \text{[Equation 9]}$$

$$S_k^{RS}(n) = \min(R_{Rk}(n) 1_{k=k^{RS}(n)}, Q_k^{RS}(n)) \quad \text{[Equation 10]}$$

Referring to the state of the queue of Equation 9, when the sum of the queue of the base station and the queue of the relay station is a virtual queen, it can be seen that resource is preferentially allocated to a user having the largest virtual queue. According to the scheduling scheme, when it is assumed that the queue of the base station 110 in a cellular system without the relay station 120 is a virtual queue ($Q_k^{BS}(n) + Q_k^{RS}(n)$), scheduling is performed on the packets accumulated in the queue of the base station. The scheduling scheme of Equation 9 and Equation 10 will be referred to as max total backlog scheduling hereinafter.

In the case of the max differential backlog scheduling of Equation 7 and Equation 8 as discussed above, when the base station 110 performs scheduling, the scheduling is performed unfairly between the user through the relay station and the user connected by the direct link, but in the case of the max total backlog scheduling scheme of Equation 9 and Equation 10, since scheduling is performed without discriminating the user connected to the base station 110 by way of the relay station 120 and the user connected to the base station 110 through a direct link, resource can be allocated fairly.

Hereinafter, the scheduling process of the relay station for implementing the max total backlog scheduling as expressed in Equation 9 and Equation 10 will be described.

Figure 2:
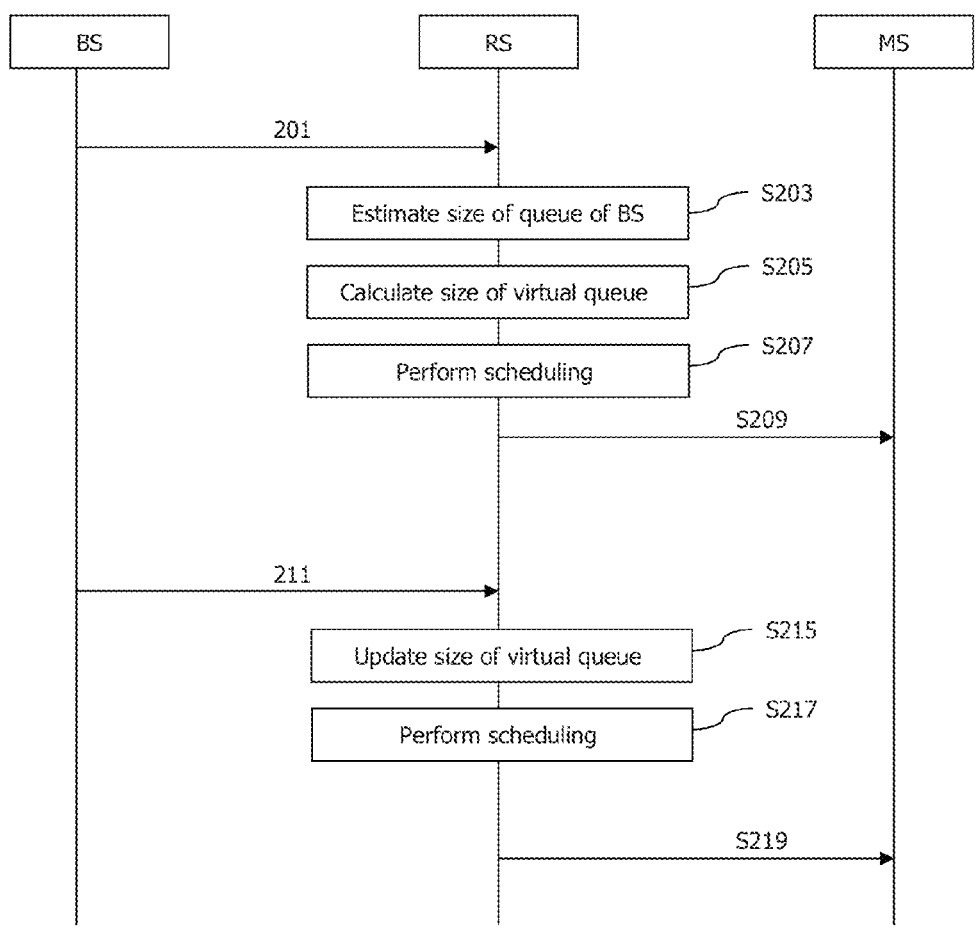
FIG. 2 is a view showing a sequential scheduling process according to a first embodiment of the present invention.

FIG. 2 is a view showing a sequential scheduling process according to a first embodiment of the present invention.

The base station 110 measures the amount of generated data to be transmitted to each user for which a link is established through the relay station, and transmits information regarding the amount of generated data of each user to the relay station 120 (S201).

According to an embodiment of the present invention, the information regarding the amount of generated data of each user is information regarding an average arrival rate $\tilde{A}_k^{BS}(n)$ of packets to be transferred to each user or a traffic generation rate of each user, and the base station 110 may measure the average arrival rate or the traffic generation rate of each user and periodically or randomly transmit the same to the relay station 120.

Upon receiving the information regarding the amount of generated data of each user from the base station 110, the relay station 120 estimates the size $\tilde{Q}_k^{BS}(n)$ of the queue of the base station in which the data to be transmitted to the user (user K) based on the received information (S203).

The relay station 120 regards a packet arriving at the base station 110 as a constant bit rate (CBR) packet, and periodically calculates the size $\tilde{Q}_k^{BS}(n)$ of the virtual queue of the base station and updates the estimation results by a certain time unit.

When the size of the virtual queue of the base station estimated at an nth time is $\tilde{Q}_k^{BS}(n)$, the size of $\tilde{Q}_k^{BS}(n+1)$ of the virtual queue of the base station estimated at an (n+1)th time may be expressed by Equation 11 shown below:

$$\tilde{Q}_k^{BS}(n+1)=\max(\tilde{Q}_k^{BS}(n)-S_k^{BS}(n),0)+\tilde{A}_k^{RS}(n), k=1,2,\ldots,K \quad \text{[Equation 11]}$$

Thereafter, the relay station 120 determines the size of the virtual queue obtained by adding the estimated size $\tilde{Q}_k^{BS}(n)$ of the queue of the base station and the size $Q_k^{RS}(n)$ of the queue of the relay station in which the data to be transmitted from the relay station to the user is stored (S205).

The virtual queue is assumed to be a single virtual queue of the base station obtained by adding the queue of the base station and the queue of the relay station. In a sense that the queue corresponds to a queue storing the overall data to be transmitted to the user K, it may be called a virtual queue. The size of the virtual queue is determined as expressed by Equation 12 shown below:

$$\tilde{Q}_k^{BS}(n)+Q_k^{RS}(n) \quad \text{[Equation 12]}$$

The relay station 120 performs scheduling for resource allocation based on the size of the virtual queue (S207). Scheduling is performed by the relay station 120 on the user K as expressed by Equation 13 shown below:

$$\gamma^{RS}(n) = \arg\max_{k=1,\ldots,K} \gamma_k R_{Rk}(n)(\tilde{Q}_k^{BS}(n) + Q_k^{RS}(n)) \quad \text{[Equation 13]}$$

Thereafter, the relay station 120 determines resource allocation priority based on the scheduling results and transfers the generated data to the user (S209).

According to circumstances, the base station 110 may periodically or randomly transmit the information regarding the size $Q_k^{BS}(n)$ of the queue of the base station storing the data to be transmitted to the user to the relay station 120 (S211).

Upon receiving the information regarding the size $Q_k^{BS}(n)$ of the queue of the base station storing the data to be transmitted to the user from the base station 110, the relay station 120 updates the information regarding the size $\tilde{Q}_k^{BS}(n)$ of the queue of the base station estimated in step S203 with the information regarding the size $Q_k^{BS}(n)$ of the queue received from the base station (S215).

Thereafter, a scheduling process of the relay station is performed based on the updated information regarding the size of the queue of the base station (S217). Scheduling is performed by the relay station 120 on the user as expressed by Equation 14 shown below:

$$\gamma^{RS}(n) = \arg\max_{k=1,\ldots,K} \gamma_k R_{Rk}(n)(Q_k^{BS}(n) + Q_k^{RS}(n)) \quad \text{[Equation 14]}$$

Thereafter, the relay station 120 determines resource allocation priority of the user according to the scheduling results performed based on the updated information regarding the size of the queue of the base station, and transfers the generated data to the user (S219).

In FIG. 2, the signal transferred from the base station 110 may be the information $\tilde{A}_k^{BS}(n)$ regarding the amount of generated data to be transmitted to the user or the information $Q_k^{BS}(n)$ regarding the size of the queue of the base station storing the data to be transmitted to the user, and here, it is described that the two items of information are independently transmitted, but in a different embodiment of the present invention, the base station 110 may transmit both $\tilde{A}_k^{BS}(n)$ and $Q_k^{BS}(n)$ to the relay station 120 at a time. This will be described in detail with reference to FIG. 3.

Figure 3:
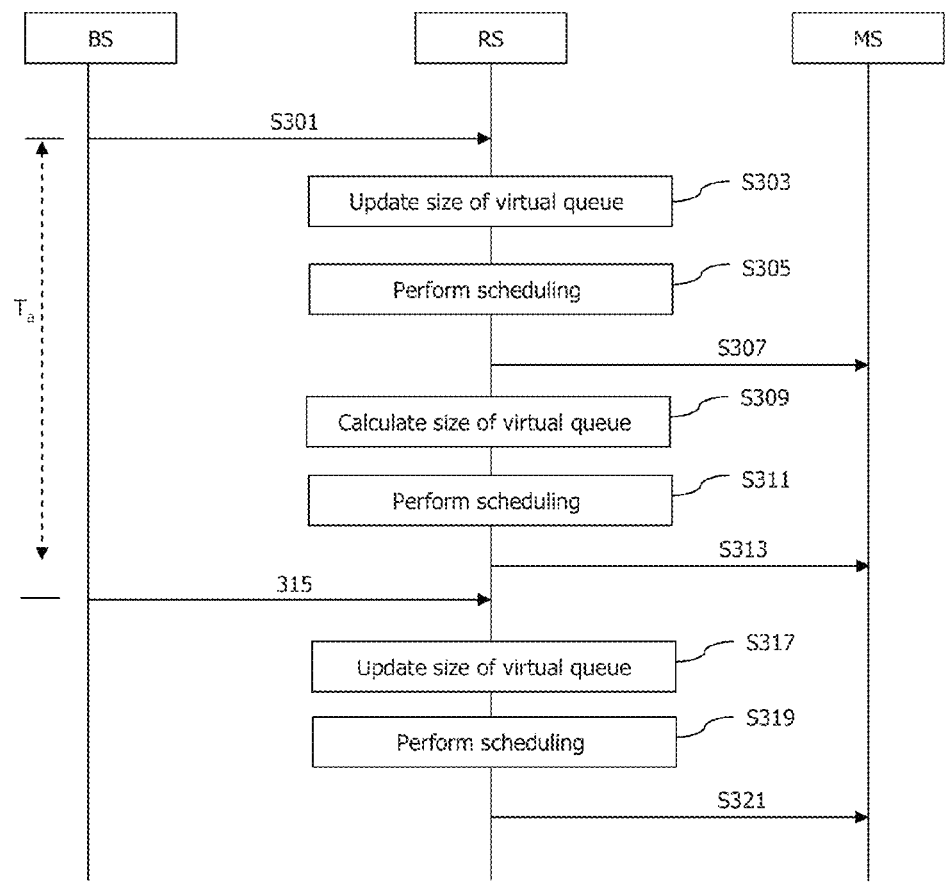
FIG. 3 is a view showing a sequential scheduling process according to a second embodiment of the present invention.

FIG. 3 is a view showing a sequential scheduling process according to a second embodiment of the present invention. Unlike the case of FIG. 2, in FIG. 3, the information $\tilde{A}_k^{BS}(n)$ and $Q_k^{BS}(n)$ is transmitted at an interval of a period Ta from the base station 110 to the relay station 120.

The relay station 120 may periodically receive information regarding the amount of generated data to be transmitted to the user from the base station 110 and estimates the size $\tilde{Q}_k^{BS}(n)$ of the queue of the base station storing the data to be transmitted to the user. The estimation of the size of the queue of the base station is the same as described above with reference to FIG. 2.

Also, the base station 110 transmits the information regarding the size $Q_k^{BS}(n)$ of the queue of the base station storing the data to be transmitted to the user to the base station 120 at a Ta interval of period (S301).

The relay station 120 periodically receives the information regarding the size $Q_k^{BS}(n)$ of the queue of the base station from the base station 110 and updates the size $\tilde{Q}_k^{BS}(n)$ of the queue of the base station estimated previously with the size $Q_k^{BS}(n)$ (S303).

Thereafter, the relay station 120 obtains the size of a virtual queue storing the overall data to be transmitted to the user with reference to the updated information regarding the size of the queue of the base station and the size of the queue storing the data to be transmitted to the user, and performs scheduling to allocate resource based on the obtained size of the virtual queue (S305).

Thereafter, the relay station 120 transmits data to the user based on the scheduling results (S307).

In FIG. 3, information transferred from the base station is received at the Ta interval of period, and thus, during a time between intervals during which the information transmitted by the base station is received, the relay station 120 performs a process of estimating the size of the queue of the base station and updating the size of the virtual queue (S309).

Referring to the updated size of the virtual queue, as described above with reference to Equation 11, when the size of the queue of the base station at the nth time is $Q_k^{BS}(n)$, the size $\tilde{Q}_k^{BS}(n+1)$ of the virtual queue of the base station estimated at the (n+1)th time is determined, based on which the size of the virtual queue is determined.

The base station 120 performs scheduling based on the size of the virtual queue calculated at the (n+1)th time (S311) and transmits data to the user (S313).

Thereafter, when the relay station 120 receives information regarding the size $Q_k^{BS}(n)$ of the queue of the base station storing data to be transmitted to the user from the base station 110 at the Ta interval of period again (S315), the relay station updates the size of the virtual queue by using the received information regarding the size of the queue of the base station (S317), performs scheduling (S319), and then, transmits data to the user (S321).

In the scheduling process performed by the relay station as described above with reference to FIG. 3, the relay station 120 periodically receives the average arrival rate of the packets transferred from the base station 110 or the size of the queue of the base station, determines the size of the virtual queue based on the same, and performs scheduling, but the base station 110 may aperiodically provides the information to the relay station 120. Namely, the base station 110 may inform the base station 120 about the size of the queue of the base station 110 under the condition that the size of the queue within the buffer of the base station 110 arrives at a predetermined reference. For example, when the size of the queue of the base station 110 is changed at a certain rate or higher or when the average arrival rate is changed at a certain rate or higher, the base station 110 may transfer the corresponding information to the relay station 120. This will be described in detail with reference to FIG. 4.

Figure 4:
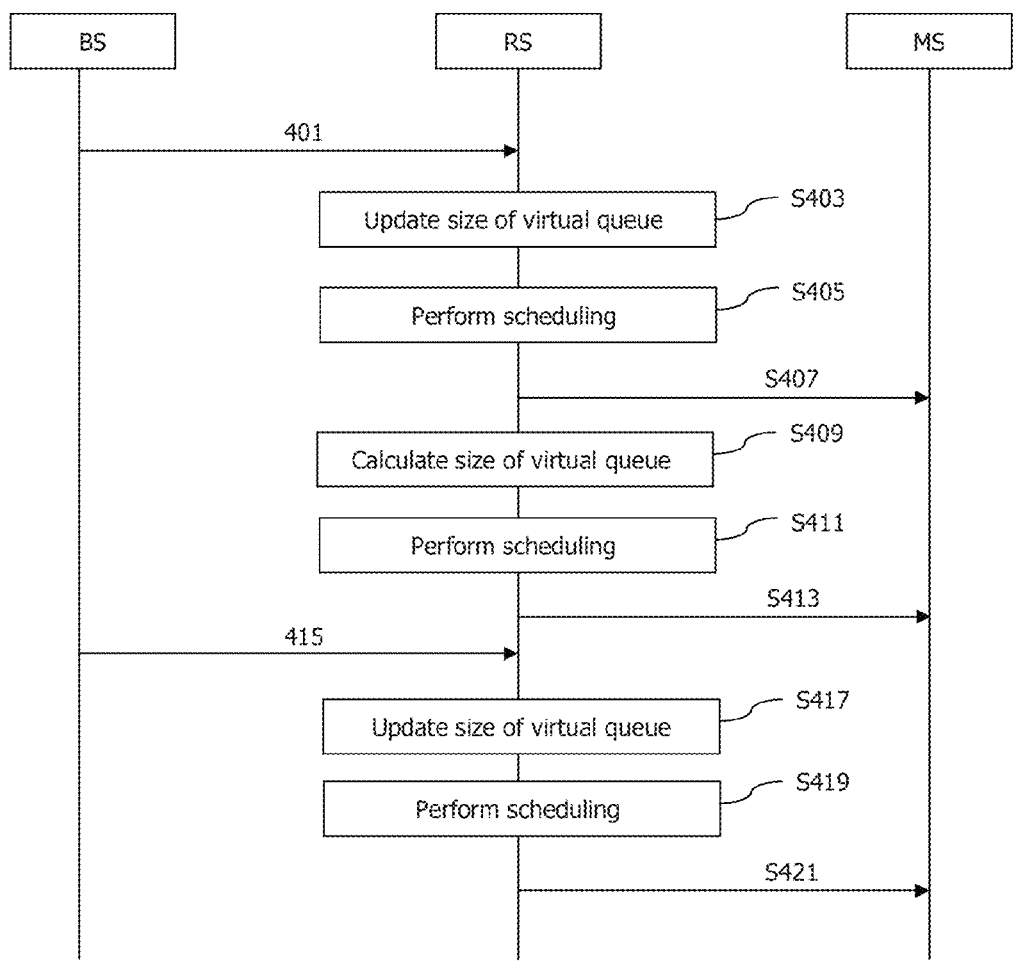
FIG. 4 is a view showing a sequential scheduling process according to a third embodiment of the present invention.

FIG. 4 is a view showing a sequential scheduling process according to a third embodiment of the present invention.

When the size of the queue of the base station storing the data to be transmitted to the user corresponds with a predetermined reference, the base station 110 transmits the information regarding the size of the queue to the relay station 120 (S401).

When the size of the queue of the base station storing the data to be transmitted to the user is a certain value or greater or smaller, the base station 110 may transmit the information regarding the size of the queue.

The relay station 120 determines the size of the virtual queue storing the overall data to be transmitted to the user or updates the previously determined size of the virtual queue with reference to the information regarding the size of the queue received from the base station and the size of the queue storing the data to be transmitted to the user from the relay station (S403).

Based on the size of the virtual queue determined as described above, the relay station 120 performs scheduling to allocate resource (S405), and transmits data to the user based on the scheduling results (S407).

Thereafter, although the base station 110 does not transmit additional information to the relay station 120 because the size of the queue of the base station 110 is be changed to be more than a certain rate or the average arrival rate is not changed to be more than a certain rate, the relay station 120 updates the size of the virtual queue for a data transmission of a next time (S409), performs scheduling based on the updated size of the virtual queue (S411), and transmits data to the user (S413).

When the size of the queue of the base station 110 is changed to be more than a certain rate of when the average arrival rate is changed to be more than the certain rate, the base station 110 transmits the information regarding the size of the queue of the base station storing the data to be transmitted to the user to the relay station 120 again (S415). Thereafter, a scheduling operation of the relay station 120 is the same as described above, so a repeated description thereof will be omitted.

According to another embodiment of the present invention, in order to simply implement the scheduling operation of the relay station, the base station 110 may determine scheduling priority of the relay station and provide the corresponding information. This will be described in detail with reference to FIG. 5.

Figure 5:
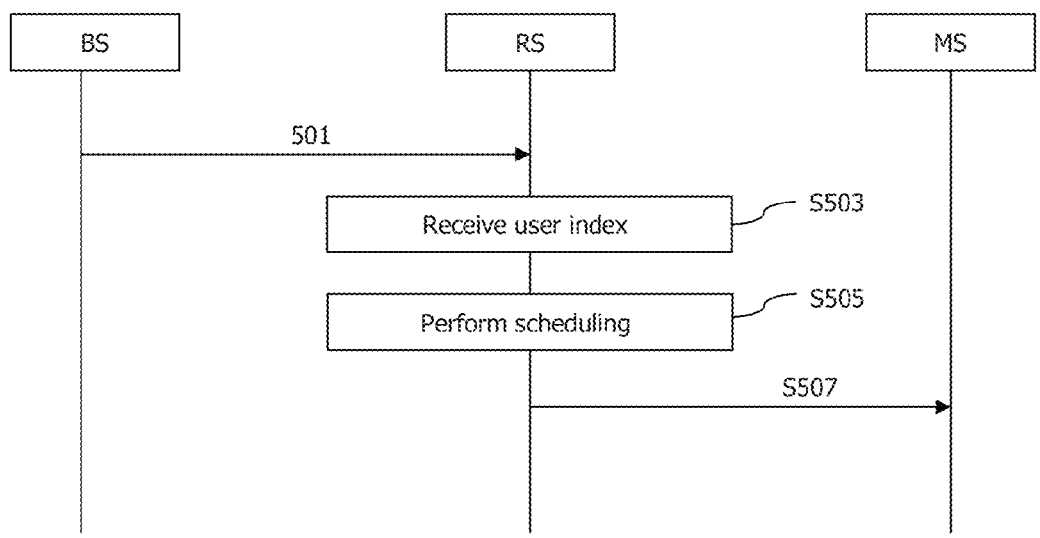
FIG. 5 is a view showing a sequential scheduling process according to a fourth embodiment of the present invention.

FIG. 5 is a view showing a sequential scheduling process according to a fourth embodiment of the present invention.

The base station 110 transmits user index information indicating that the amount of data to be transmitted to the user exceeds a certain reference to the relay station 120 (S501).

The user index information transmitted by the base station 110 may be index information indicating an index of users whose amount of currently accumulated packets is the largest based on the amount of packets to be transmitted by the base station 110 to the relay station 120, or indicating scheduling priority of each user with reference to the amount of packets currently accumulated in the queue of the base station.

According to circumstances, the base station 110 may determine scheduling priority of the relay station 120 and transmit the corresponding priority.

The relay station 120 receives the user index information from the base station 110 (S503), and performs scheduling to determine resource allocation priority of each user with reference to the received user index information and the size of the queue of the relay station storing the data to be transmitted to the user from the relay station 120 (S505).

According to circumstances, the relay station 120 may perform scheduling based on the priority information transferred from the base station, rather than performing a scheduling algorithm.

Thereafter, the relay station 120 transmits data to the user based on the scheduling results (S507).

Figure 6:
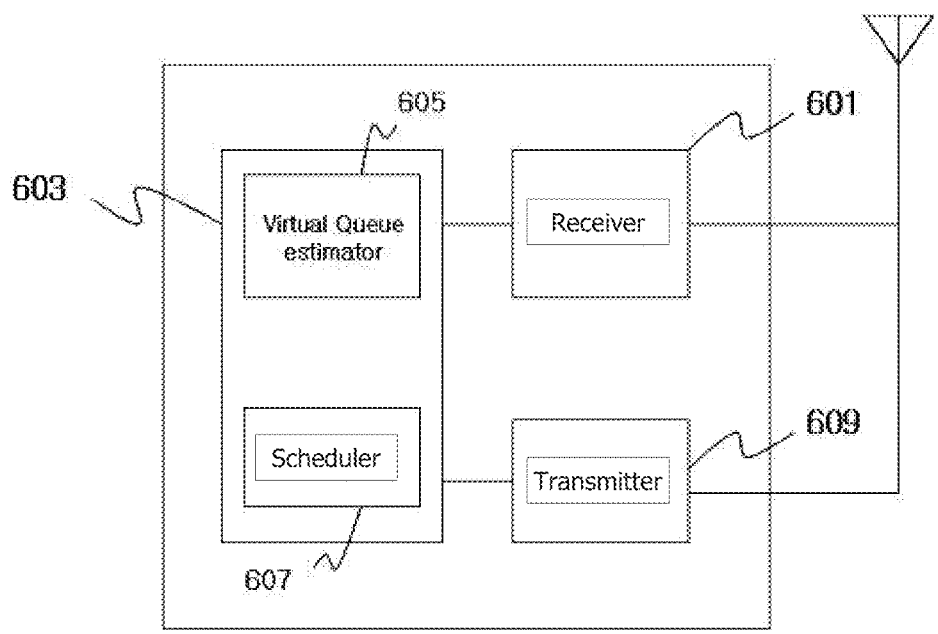
FIG. 6 is a schematic block diagram of a scheduling apparatus of a relay communication system according to an embodiment of the present invention.

FIG. 6 is a schematic block diagram of a scheduling apparatus of a relay communication system according to an embodiment of the present invention.

The scheduling apparatus includes a receiver 601, a controller 503 including a virtual queue estimator 605 and a scheduler 607, and a transmitter 609.

The receiver 601 receives the amount of generated data to be transmitted to the user from the base station and information regarding the size of a queue of the base station storing data to be transmitted to the user.

The virtual queue estimator 605 estimates the size of the queue of the base station storing the data to be transmitted to the user based on the amount of generated data received from the base station, and determines the size of a virtual queue storing the overall data to be transmitted to the user with reference to the estimated size of the queue of the base station and the size of the queue of the relay station storing data to be transmitted to the user.

The scheduler 607 performs scheduling to allocate resource based on the size of the virtual queue determined by the virtual queue estimator 605.

The transmitter 609 transmits data to the user based on the scheduling results from the scheduler 607.

According to another embodiment of the present invention, in order to lower implementation complexity of the controller 603, the receiver 601 may receive user index information whose amount of data to be transmitted to the user exceeds a certain reference from the base station, and the scheduler 607 may determine resource allocation priority of each user with reference to the user index information received from the base station and the size of the queue storing the data to be transmitted from the relay station.

Figure 7:
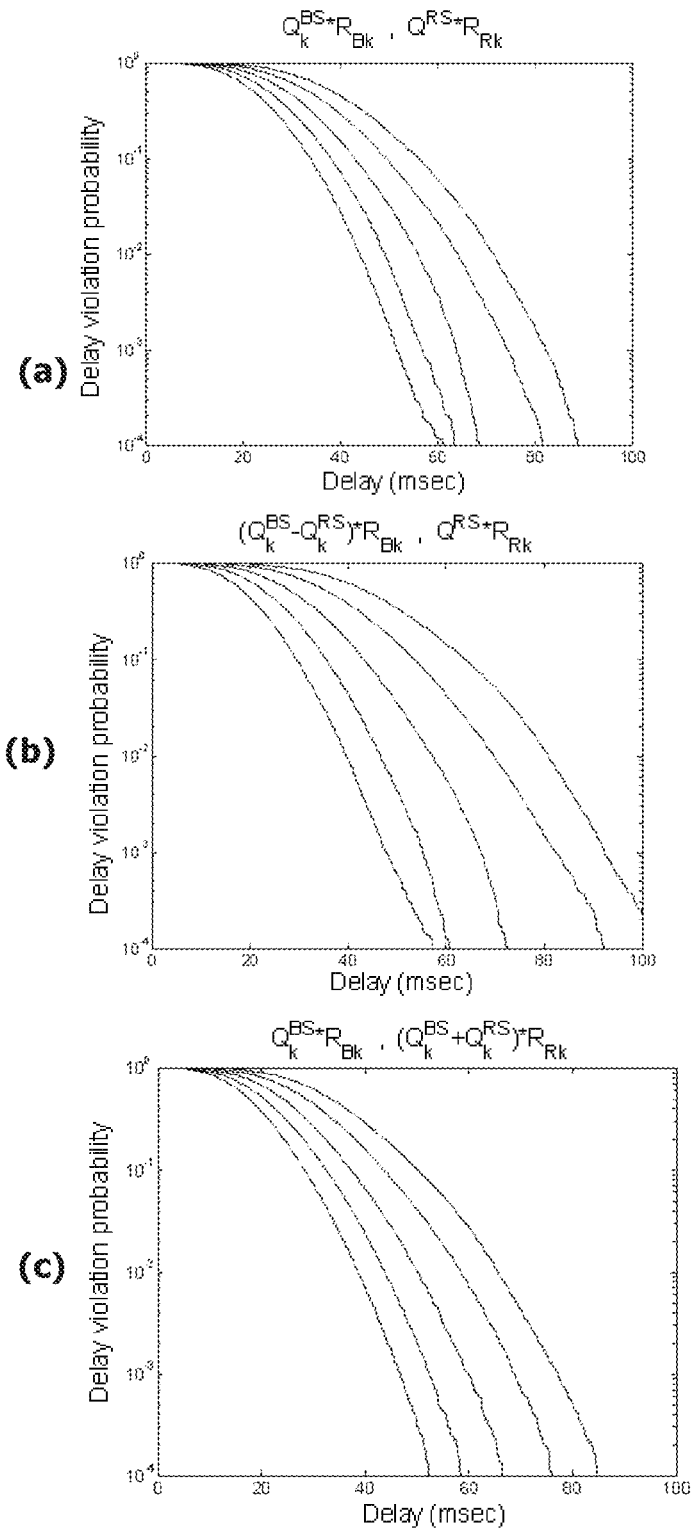
FIGS. 7 and 8 are graphs showing performance comparison results showing delay violation probability of a user according to a scheduling scheme.
Figure 8:
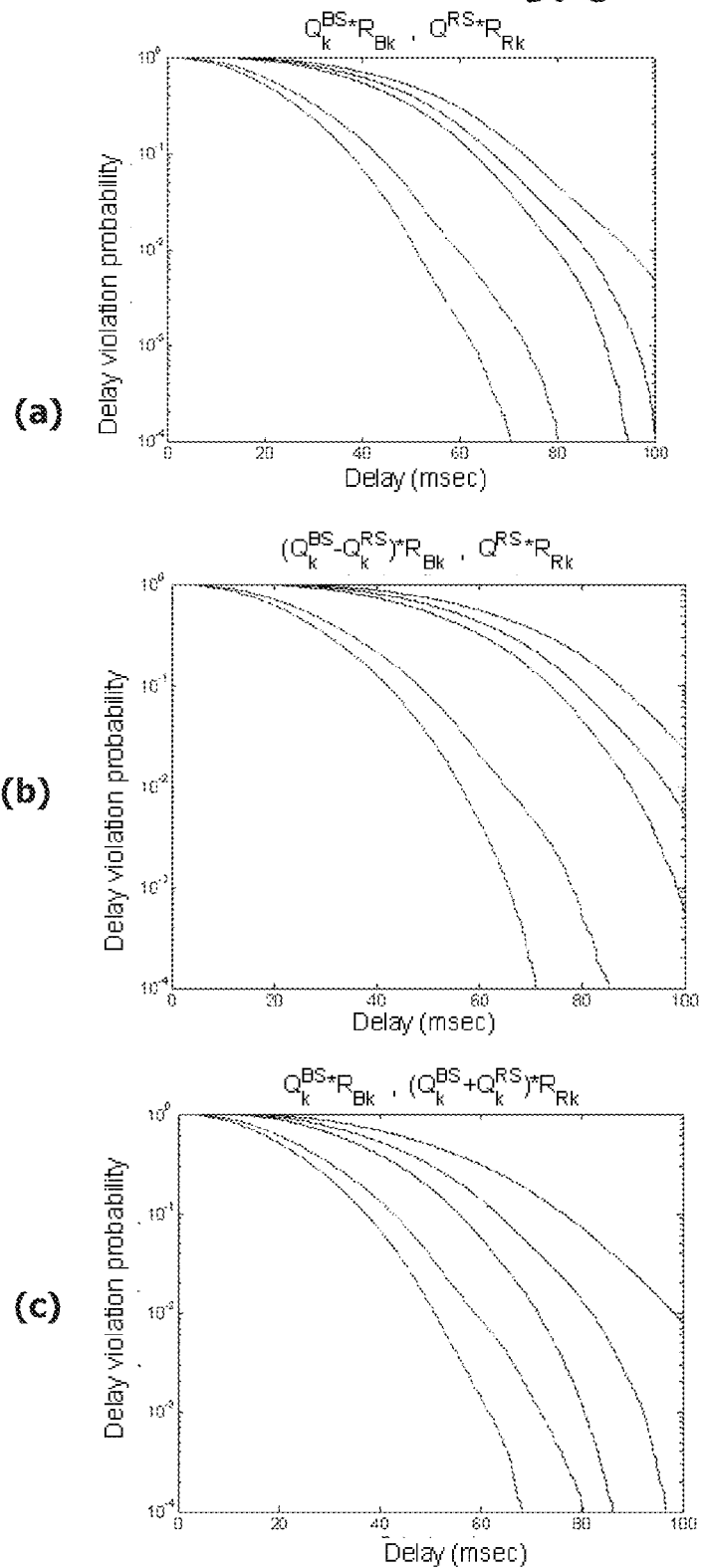

FIGS. 7 and 8 are graphs of performance comparison results showing delay violation probability of a user according to a scheduling scheme.

FIG. 7 shows delay violation probability when all of the users are connected to the relay station 120. In FIG. 7, (a) shows a case of employing max backlog scheduling, (b) shows a case of employing max differential backlog scheduling, and (c) shows a case of employing max total backlog scheduling according to an embodiment of the present invention.

Also, FIG. 7 shows the probability of exceeding a particular delay time of five users when all of the five users are connected to the base station 110 through the relay station 120. Namely, it means that when a scale in the x axis is 60 msec, if a scale in the y axis is 0.01, the probability that a packet experiences delay of 60 msec or more is 1%. Also, in FIG. 7, it is assumed that packets of each user arrive at the base station at 300 kbps and a signal-to-noise ratio (SNR) between the base station and the relay station is 10 dB and SNRs between the relay station and the respective users are 2, 3, 4, 5, and 6 dB, respectively.

When (a), (b), and (c) in FIG. 7 are compared, it can be seen that a delay time of the max total backlog scheme (c) proposed in the present invention is considerably reduced in comparison to the existing schemes (a) and (b).

FIG. 8 show delay violation probability when three users are connected to the base station by way of the relay station and two users are directly connected to the user. SNRs of the two users directly connected to the base station are 6 dB and 7 dB, respectively, and SNRs of the three users connected to the relay station are 2 dB, 3 dB, and 4 dB, respectively.

In FIG. 8, (a) shows a case of employing max backlog scheduling, (b) shows a case of employing max differential backlog scheduling, and (c) shows a case of employing max total backlog scheduling proposed in the present invention.

It can be seen that, in case of max backlog and max total backlog, the users directly connected to the base station have similar performance in (a), (b), and (c), while the performance of max differential backlog was not good. This is because the users connected to the base station by way of the relay station are discriminated, as described above.

Also, it can be seen that the users connected by way of the relay station have better performance of max total backlog than those of the other two schemes.

The method according to exemplary embodiments of the present invention described thus far may be implemented as software, hardware or a combination thereof. For example, the method according to exemplary embodiments of the present invention may be stored in a storage medium (e.g., an internal memory, a flash memory, a hard disk, or the like), and may be implemented as codes or commands in a software program that can be executed by a processor (e.g., a microprocessor in a terminal).

The exemplary embodiments of the present invention will now be described with reference to the accompanying drawings, in which like numbers refer to like elements throughout. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings. The technical idea of the present invention should be interpreted to embrace all such alterations, modifications, and variations in addition to the accompanying drawings.

The invention claimed is:

1. A scheduling method of a relay station in a relay communication system, the method comprising:
   receiving information regarding an amount of generated data to be transmitted to a user from a base station;
   estimating a size of a queue of the base station storing the data to be transmitted to the user based on the amount of generated data received from the base station;
   obtaining a size of a virtual queue in which overall data to be transmitted to the user with reference to the estimated size of the queue of the base station and a size of a queue of the relay station storing the data to be transmitted to the user;
   performing scheduling to allocate resources based on the size of the virtual queue; and
   transmitting the data to the user based on results of the scheduling performed,
   wherein when the estimated size of the queue of the base station is $\tilde{Q}_k^{BS}(n)$, the size of the queue of the relay station is $Q_k^{RS}(n)$, a channel link transfer rate between the user and the relay station is $R_{Rk}(n)$, and a scheduling constant value of the user is $\gamma_k$, then, the scheduling $\gamma^{RS}(n)$ is determined by the following Equation:

$$\gamma^{RS}(n) = \arg\max_{k=1,\ldots,K} \gamma_k R_{Rk}(n)(\tilde{Q}_k^{BS}(n) + Q_k^{RS}(n)).$$

wherein each of n, k, and K is an integer.

2. The method of claim 1, wherein the information regarding the amount of generated data received from the base station is average arrival rate information of a packet to be transmitted to the user, and the average arrival rate information is periodically received from the base station.

3. The method of claim 1, wherein the estimating the size of the queue of the base station comprises:
   receiving further information regarding the size of the queue of the base station storing the data to be transmitted to the user from the base station; and
   updating the estimated information regarding the size of the queue of the base station based on the received further information regarding the size of the queue of the base station.

4. A scheduling method of a relay station in a relay communication system, the method comprising:
   periodically receiving information regarding an amount of generated data to be transmitted to a user from a base station to estimate a size of a queue of the base station storing the data to be transmitted to the user;
   periodically receiving the information regarding the size of the queue of the base station storing the data to be transmitted to the user from the base station to update the estimated size of the queue of the base station;
   obtaining a size of a virtual queue storing overall data to be transmitted to the user with reference to the updated size of the queue of the base station and a size of a queue of the relay station storing the data to be transmitted to a the user;
   performing scheduling to allocate resources based on the size of the virtual queue; and
   transmitting the data to the user based on results of the scheduling performed,
   wherein when the updated size of the queue of the base station is $Q_k^{BS}(n)$, the size of the queue of the relay station is $Q_k^{RS}(n)$, a channel link transfer rate between the user and the relay station is RRk(n), and a scheduling constant value of the user is $\gamma_k$, then, the scheduling $\gamma^{RS}(n)$ is determined by the following Equation:

$$\gamma^{RS}(n) = \arg\max_{k=1,\ldots,K} \gamma_k R_{Rk}(n)(Q_k^{BS}(n) + Q_k^{RS}(n)).$$

wherein each of n, k, and K is an integer.

5. A scheduling method of a relay station in a relay communication system, the method comprising:
   receiving information regarding a size of a queue of a base station storing data to be transmitted to a user from the base station when the size of the queue of the base station corresponds to a predetermined reference;
   obtaining a size of a virtual queue storing overall data to be transmitted to the user with reference to the information regarding the size of the queue of the base station received from the base station and a size of a queue of the relay station storing the data to be transmitted to the user;
   performing scheduling to allocate resources based on the size of the virtual queue; and
   transmitting the data to the user based on results of the scheduling performed, wherein when the updated size of the queue of the base station is $Q_k^{BS}(n)$, the size of the queue of the relay station is $Q_k^{RS}(n)$, a channel link transfer rate between the user and the relay station is RRk(n), and a scheduling constant value of the user is $\gamma_k$, then, the scheduling $\gamma^{RS}(n)$ is determined by the following Equation:

$$\gamma^{RS}(n) = \arg\max_{k=1,\ldots,K} \gamma_k R_{Rk}(n)(Q_k^{BS}(n) + Q_k^{RS}(n)).$$

wherein each of n, k, and K is an integer.

6. The method of claim 5 the information regarding the size of the queue of the base station is received from the base station when the size of the queue of the base station storing the data to be transmitted to the user is greater than or smaller than a predetermined value.

7. A scheduling apparatus of a relay station in a relay communication system, the apparatus comprising:
   a receiver configured to receive an amount of generated data to be transmitted to a user and information regarding a size of a queue of a base station storing the data to be transmitted to the user from the base station;
   a virtual queue estimator configured to estimate the size of the queue of the base station storing the data to be transmitted to the user based on the amount of generated data received from the base station and to determine a size of a virtual queue storing overall data to be transmitted to the user with reference to the estimated size of the queue of the base station and a size of a queue of the relay station storing the data to be transmitted to the user;
   a scheduler configured to perform scheduling to allocate resources based on the size of the virtual queue determined by the virtual queue estimator; and
   a transmitter configured to transmit the data to the user based on results of the scheduling performed by the scheduler,
wherein when the estimated size of the queue of the base station is $\tilde{Q}_k^{BS}(n)$, the size of the queue of the relay station is $Q_k^{RS}(n)$, a channel link transfer rate between the user and the relay station is $R_{Rk}(n)$, and a scheduling constant value of the user is $\gamma_k$, then, the scheduling $\gamma^{RS}(n)$ is determined by the following Equation:

$$\gamma^{RS}(n) = \arg\max_{k=1,\ldots,K} \gamma_k R_{Rk}(n)\left(\tilde{Q}_k^{BS}(n) + Q_k^{RS}(n)\right).$$

wherein each of n, k, and K is an integer.

8. The apparatus of claim 7, wherein the receiver is further configured to receive user index information of a user whose amount of data to be transmitted to the user from the base station exceeds a predetermined reference, and the scheduler is further configured to determine a resource allocation priority of each user with reference to the user index information received from the base station and the information regarding the size of the queue of the base station storing the data to be transmitted to the user received from the base station.

* * * * *

UNITED STATES PATENT AND TRADEMARK OFFICE
CERTIFICATE OF CORRECTION

| | | |
|---|---|---|
| PATENT NO. | : 8,737,287 B2 | Page 1 of 1 |
| APPLICATION NO. | : 13/389437 | |
| DATED | : May 27, 2014 | |
| INVENTOR(S) | : Seo et al. | |

It is certified that error appears in the above-identified patent and that said Letters Patent is hereby corrected as shown below:

On the Title Page: Item [73] Assignee; insert -- INHA-IDUSTRY PARTNERSHIP INSTITUTE, Incheon (KR) -- following LG ELECTRONICS INC., Seoul (KR).

Signed and Sealed this
Sixth Day of January, 2015

Michelle K. Lee
*Deputy Director of the United States Patent and Trademark Office*